(12) United States Patent
Lin

(10) Patent No.: US 6,438,321 B1
(45) Date of Patent: Aug. 20, 2002

(54) CONTROL OF HIGH SPEED DC MOTOR VERTICAL VOLTAGE VECTOR COMPONENT

(75) Inventor: Huai Yu Lin, Wantirna South (AU)

(73) Assignee: TurboCorp Limited, Victoria (AU)

( * ) Notice: Subject to any disclaimer, the term of this patent is extended or adjusted under 35 U.S.C. 154(b) by 0 days.

(21) Appl. No.: 09/623,381

(22) PCT Filed: Mar. 2, 1999

(86) PCT No.: PCT/AU99/00128

§ 371 (c)(1),
(2), (4) Date: Nov. 13, 2000

(87) PCT Pub. No.: WO99/45632

PCT Pub. Date: Sep. 10, 1999

(30) Foreign Application Priority Data

Mar. 2, 1998 (AU) .............................................. PP2087

(51) Int. Cl.$^7$ ................................................ H02P 5/00
(52) U.S. Cl. ..................... 388/800; 388/806; 388/815; 388/822; 318/254; 318/138; 318/439
(58) Field of Search ................................ 388/800, 806, 388/815, 822, 906; 318/254, 439, 138, 609, 799, 805, 808, 812

(56) References Cited

U.S. PATENT DOCUMENTS

| | | | |
|---|---|---|---|
| 4,088,934 A | 5/1978 | D'Atre et al. | 318/802 |
| 4,649,331 A | 3/1987 | Jahns | 318/806 |
| 5,365,153 A | 11/1994 | Fujita et al. | 318/803 |
| 5,541,488 A | 7/1996 | Bansal et al. | 318/801 |
| 5,644,205 A | 7/1997 | Nguyen Phuoc et al. | |
| 5,777,447 A | 7/1998 | Okano | 318/254 |
| 5,903,128 A | 5/1999 | Sakakibara et al. | 318/439 |
| 5,949,210 A | 9/1999 | Gataric et al. | 318/609 |

FOREIGN PATENT DOCUMENTS

| | | |
|---|---|---|
| JP | 58-116094 | 7/1983 |
| JP | 63-305762 | 12/1988 |
| JP | 10-127086 | 5/1998 |

Primary Examiner—Robert E. Nappi
Assistant Examiner—Edgardo San Martin
(74) Attorney, Agent, or Firm—Barnes & Thornburg

(57) ABSTRACT

A motor controller utilizes sensors to detect the rotational speed and relative position of the motor rotor and generates a voltage vector to maintain the motor current in phase with the EMF before a voltage limit is reached. The approximate actual speed is calculated and position signals are generated by the calculator. The actual speed is compared with a command speed signal and any difference gives rise to an error signal. A proportional integrator receives the error signal and produces a correction signal for a vector rotator corresponding to the desired vertical voltage component necessary to achieve the command speed. After the voltage limit is reached, any further speed increase desired is achieved by rotation of the voltage vector with it's amplitude unchanged.

8 Claims, 1 Drawing Sheet

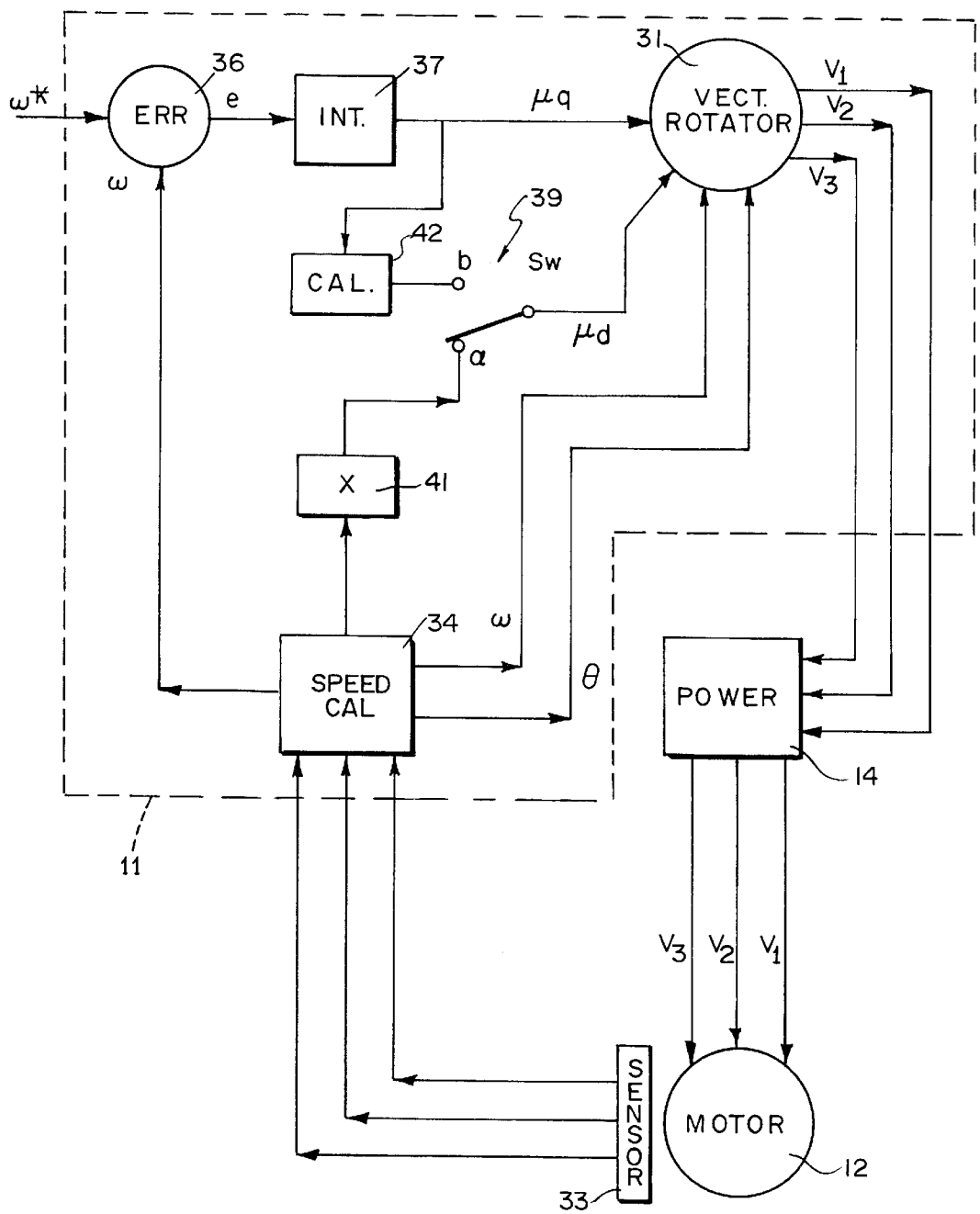

CONTROL OF HIGH SPEED DC MOTOR VERTICAL VOLTAGE VECTOR COMPONENT

FIELD OF THE INVENTION

This invention relates to a motor controller and relates particularly to a motor controller for high speed, brushless DC motors to enable the motor speed to be controlled between minimum and maximum speeds with optimum efficiency.

International Patent Application No PCT/AU98/00035 describes a high speed, brushless DC motor which is designed particularly for driving a refrigerant compressor or the like. This motor has a rotor formed with a rare earth magnet (NdFeB) within a non-magnetic sleeve, and a stator winding of very low inductance to enable near unity power factor to be achieved between the base speed and maximum speed of the motor.

The present invention enables a motor of the type described in the aforesaid international patent application, or motors of similar design to be controlled without the need utilize complex and relatively expensive control equipment.

In order that the motor speed is able to be controlled within desirable limits using low cost control components, it is necessary to devise a motor controller which is able to take advantage of the low inductance design of the stator windings. Accordingly, it is desirable to provide a motor controller which is able to control the speed of a high speed, DC motor having low inductance stator windings.

It is also desirable to provide a motor controller of relatively low cost but effective in providing the necessary speed control required for a refrigeration compressor or the like.

It is also desirable to provide a motor controller which can be used in relation to motors of a range of sizes and structural make up.

It is also desirable to provide a motor controller which is able to control the motor speed in accordance with load demands.

SUMMARY OF THE INVENTION

According to one aspect of the invention there is provided a motor controller for a high speed, DC electric motor including sensors to detect the relative position of the rotor of the motor, speed calculator to receive position signals from the sensors and to calculate therefrom the approximate relative position and speed of rotation of the rotor, a vector rotator which receives actual speed and position signals from the speed calculator, an error signal generator to generate an error signal corresponding to any detected difference between a command speed signal and the actual speed signal, a proportional integrator to receive any error signal and produce a signal for the vector rotator corresponding to the desired vertical component of the voltage vector required to achieve the command speed, and power stage to amplify the vector rotator output to supply to the motor.

The controller of this invention is designed particularly for use in relation to high speed electric motors having a low inductance stator winding so as to maintain close to unity power factor during the range of operational speeds. Such an electric motor, as is described in the aforesaid International Patent Application No PCT/AU98/00035, is designed for use in a refrigeration system in which the speed of rotation of the centrifugal compressor is load-dependent. Refrigeration systems invariably run at less than full load capacity for a relatively large part of their operating time. The controller of the invention ensures that the power requirements of the motor result in maximum efficiencies over the total operation speed of the compressor. This is done by the controller generating a voltage vector in response to the sensors to maintain the motor current substantially in phase with the electric motive force (EMF) before the voltage limit is reached. Any further speed increase required after the voltage limit is reached is achieved by rotating the voltage vector while maintaining the amplitude constant.

In one preferred embodiment of the invention, the position sensors determine the rotational position of the rotor and its instantaneous rotational speed. The instantaneous speed determinations cannot detect acceleration between sensor positions so that the calculated actual speed of the rotor may include a degree of approximation. Any difference, however, between the detected speed and the actual speed is not significant for the purposes of the speed calculation.

The calculated actual speed is compared with a speed command signal to detect any difference. The speed command signal may be derived from a refrigeration system control circuit producing a speed signal corresponding to detected system load.

A vector rotator generates control voltages, the vertical and horizontal components of which reflect the speed command as modified by the difference with the detected speed.

Preferably, a conditional switch is provided in the controller so that the voltage amplitude and voltage angle are maintained commensurate with the command speed signal to maintain a minimum current for a given torque output. The conditional switch, in one position, applies a function of the actual rotor speed as the horizontal component and load demand as the vertical component to the vector rotator. The switch moves to a second position when the vertical and horizontal components of the voltage vector satisfy the condition $\mu_q^2 + \mu_d^2 = 1$, and field weakening takes effect and any further increase in speed causes the vector rotator to rotate the voltage vector with the amplitude of the vector unchanged. In this way, the power factor is maintained close to unity.

The sensors which detect the relative position of the rotor comprise three position sensors displaced 120° from each other. Because the sensors detect the instantaneous position of a magnetic field rotating with the rotor, and as the rotational speed may vary between sensors, the actual rotor position measured is necessarily approximate due to the possible speed changes between the sensor positions. However, at rotational speeds of between 20,000 rpm and 55,000 rpm, the approximation may be disregarded for the purposes of the controller of the invention.

In order that the invention is more readily understood, an embodiment thereof is described with reference to the accompanying drawing.

DESCRIPTION OF THE DRAWING

FIG. 1 is a diagrammatic block diagram illustrating one form of motor controller in accordance with the invention.

DESCRIPTION OF THE PREFERRED EMBODIMENT

The motor controller of this embodiment is in the form of a micro controller 11 to control the motor 12 through a power stage 14. The motor controller is diagrammatically shown in FIG. 1 where:

ω=actual speed
ω*=command speed
$\mu_q$=the vertical component of voltage vector
$\mu_d$=the horizontal component of voltage vector
θ=rotor position The relative position and the approximate speed of the rotor is sensed by three position sensors 33 which are located about the rotor and spaced 120° to each other. The position sensors 33 generate three pulse trains in phase with the rotor position and these are used by the position and speed calculator 34 to calculate the actual speed ω of the rotor and its position θ at a given time, within a degree of approximation, depending on whether or not a speed change occurs between sensor positions. The actual speed ω is compared with a command speed ω* by the error signal generator 36 to determine any difference between the actual speed ω and command speed ω*. If a difference is detected, the error signal generator 36 generates an error signal e.

The error signal e is used by the proportional integrator 37 to calculate the vertical component of the voltage vector $\mu_q$ which is used to control the vector rotator 31. The vector rotator 31 also receives the actual speed signal ω as well as the rotor position θ from the position and speed calculator 34. The vector rotator 31 generates three control voltages V1, V2 and V3 which are a function of the voltage vector $\mu_q$ and which are amplified by the power stage 14 to supply to the motor 12.

The micro controller 11 also includes a conditional switch 39 which switches between position a and position b. The switch is at the a position when $\mu_q^2 + \mu_d^2 < 1$ and is at the b position when $\mu_q^2 + \mu_d^2 = 1$. The multiplier 41 multiplies a correlation factor K with the actual rotor speed ω, as determined by the position and speed calculator 34. The product of this calculation, when the conditional switch 39 is in the a position, is applied to the vector rotator 31 to give the horizontal component of the voltage vector $\mu_d$. In this way the controller is able to vary the voltage amplitude and angle commensurate with the command speed ω* to keep the current to its minimum for a given torque output before the voltage limit is reached.

The correlation factor K is a speed related constant and may vary between base speed and maximum speed of the motor. The factor K is developed by conducting tests at various operational speeds of the motor to determine the optimum value of K for the motor conditions at those various speeds. The test results are used to develop a curve such as a polynomial, which is then used to determine the factor K for any given speed of the motor.

The switch 39 moves to the b position when the condition $\mu_q^2 + \mu_d^2 = 1$. When this condition occurs, field weakening takes effect and any further increase in the speed required causes the voltage vector to rotate. The vertical component of the voltage vector generated by the proportional integrator 37 is applied to the calculator 42 which determines the horizontal component $\mu_d$ by:

$$\sqrt{1-\mu_q^2}$$

The component $\mu_d$ is applied to the vector rotator 31 through the b position of the switch 39. The vector rotator develops the voltage vectors necessary for the power stage 14.

In the preferred form of the invention, the micro controller 11 used in the illustrated embodiment is an Analog Devices digital signal processor AD MC 330. Of course, other processors may be used in the performance of this invention.

The motor controller of the invention enables the vertical and horizontal components of the voltage vector to be used to control the motor speed and, at maximum voltage, when further speed increase is required, field weakening takes effect causing the voltage vector to rotate.

What is claimed is:

1. A motor controller for a high speed, DC electric motor comprising sensors which detect the relative position of a rotor of the motor, a speed calculator which receives position signals from the sensors and calculates therefrom the approximate relative position and speed of rotation of the rotor, a vector rotator which receives actual speed and position signals from the speed calculator, an error signal generator which generates an error signal corresponding to any detected difference between a command speed signal and the actual speed signal, a proportional integrator which receives any error signal corresponding to any detected difference between a command speed signal and the actual speed signal, a proportional integrator which receives any error signal and produces a signal for the vector rotator corresponding to a desired vertical component of the voltage vector required to achieve the command speed, and a power stage which amplifies the vector rotator output to supply to the motor.

2. A controller according to claim 1, wherein said sensors which detect the relative position of the rotor, comprise three position sensors displaced 120° from each other about the rotor.

3. A controller according to claim 2 wherein the sensors detect the instantaneous position of a magnetic field rotating with the rotor and generate three pulse trains in phase with the rotor position and which are used by a position and speed calculator to calculate the actual speed ω and its approximate position θ depending on whether or not a speed change occurs between sensor positions.

4. A controller according to claim 1 further including a conditional switch which provides an input signal to the vector rotator, which input signal is either a function of the actual speed of the motor as detected by the sensors or is a function of the vertical voltage component.

5. A controller according to claim 4 wherein when the switch is in a first position, it receives output from a multiplier which multiplies a correlation factor K by the actual speed to produce the vector rotator input signal.

6. A controller according to claim 5 wherein the switch moves from the first position to a second position when a preselected maximum voltage is reached, and in that second position field weakening takes effect and any further increase in the speed required causes the voltage vector to rotate.

7. A controller according to claim 6 wherein the vertical component of the voltage vector generated by the proportional integrator is applied to a calculator which determines the horizontal voltage component $\mu_d$ by:

$$\sqrt{1-\mu_q^2}$$

where
$\mu_q$=the vertical component of voltage vector, and
$\mu_d$=the horizontal component of voltage vector.

8. A motor controller according to claim 6, wherein the maximum voltage is when the square of the horizontal component added to the square of the vertical component equals one.

* * * * *